(12) United States Patent
Lee et al.

(10) Patent No.: US 9,762,297 B2
(45) Date of Patent: Sep. 12, 2017

(54) BEAM MODULATION AND DEMODULATION METHOD AND APPARATUS BASED ON BEAM-SPACE MULTIPLE INPUT MULTIPLE OUTPUT (MIMO) ANTENNA SYSTEM

(71) Applicant: Korea Advanced Institute of Science and Technology, Daejeon (KR)

(72) Inventors: Yong-Hoon Lee, Daejeon (KR); Junho Lee, Gyeonggi-do (KR); Hye Gwu Kim, Chungcheongbuk-do (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 0 days.

(21) Appl. No.: 15/003,531

(22) Filed: Jan. 21, 2016

(65) Prior Publication Data
US 2016/0218779 A1  Jul. 28, 2016

(30) Foreign Application Priority Data

Jan. 26, 2015 (KR) ......... 10-2015-0012056
Jun. 19, 2015 (KR) ......... 10-2015-0087109

(51) Int. Cl.
*H04B 7/04*  (2017.01)
*H04B 7/06*  (2006.01)
(Continued)

(52) U.S. Cl.
CPC ......... *H04B 7/0408* (2013.01); *H04B 7/0413* (2013.01); *H04B 7/063* (2013.01); *H04W 72/046* (2013.01)

(58) Field of Classification Search
CPC .. H04B 7/0617; H04B 7/0408; H04B 7/0413; H04B 7/063; H04W 72/046
See application file for complete search history.

(56) References Cited

U.S. PATENT DOCUMENTS

2010/0130223 A1* 5/2010 Liao ............... H04B 7/0617
                                                                 455/453
2011/0110453 A1* 5/2011 Prasad ............ H04B 7/0695
                                                                 375/285
(Continued)

FOREIGN PATENT DOCUMENTS

WO    2015084051 A1   6/2015

OTHER PUBLICATIONS

Korean Office Action for Korean Application No. 10-2015-0087109 dated Nov. 21, 2016, 8 pages with translation.
(Continued)

*Primary Examiner* — Ross Varndell
(74) *Attorney, Agent, or Firm* — TraskBritt

(57) ABSTRACT

Provided is a beam modulation and demodulation method and apparatus based on a beam-space multiple input multiple output (MIMO) antenna system, the beam modulation method including generating a preparatory beam list including a plurality of beams, generating a beam combination table of beam combinations of beams selected from the preparatory beam list, generating a beam modulation rule to map the beam combinations and bit data patterns, and determining a beam combination corresponding to input data from the beam combination table based on the beam modulation rule.

9 Claims, 9 Drawing Sheets

(51) Int. Cl.
    *H04B 7/0408*     (2017.01)
    *H04B 7/0413*     (2017.01)
    *H04W 72/04*     (2009.01)

(56) References Cited

U.S. PATENT DOCUMENTS

| | | | |
|---|---|---|---|
| 2013/0259164 A1 | 10/2013 | Hui et al. | |
| 2014/0177745 A1* | 6/2014 | Krishnamurthy | H04B 7/0413 375/267 |
| 2015/0305047 A1* | 10/2015 | Cheng | H04W 24/02 370/248 |
| 2015/0311971 A1* | 10/2015 | Learned | H04B 7/086 370/329 |

OTHER PUBLICATIONS

Korean Written Opnion for Korean Application No. 10-2015-0087109 dated Jan. 19, 2017, 16 pages with translation.
Ramirez-Gutierrez et al., Antenna Beam Pattern Modulation for MIMO Channels, Wireless Communications and Mobile Computing Conference (IWCMC), 2012 8th International, IEEE, Aug. 27, 2012 (Aug. 27, 2012), pp. 591-595.

* cited by examiner $x = B_x$
$y = HB_s + n \ (K < N_R < N_T < N_B)$

BEAM MODULATION AND DEMODULATION METHOD AND APPARATUS BASED ON BEAM-SPACE MULTIPLE INPUT MULTIPLE OUTPUT (MIMO) ANTENNA SYSTEM

CROSS-REFERENCE TO RELATED APPLICATIONS

Pursuant to 35 U.S.C. §119(a), this application claims the benefit of the filing date of Korean Patent Application Serial No. 10-2015-0012056, which was filed on Jan. 26, 2015, and of Korean Patent Application Serial No. 10-2015-0087109, which was filed on Jun. 19, 2015, in the Korean Intellectual Property Office, the disclosure of each of which is hereby incorporated herein in its entirety by this reference.

TECHNICAL FIELD

Embodiments relate to a beam modulation and demodulation method and apparatus based on a beam-space multiple input multiple output (MIMO) antenna system.

BACKGROUND

Recently, according to a rapid increase in a high transmission rate for wireless communication, research has been actively conducted to apply multiple input multiple output (MIMO) antenna technology to a transmitter/receiver.

To implement the transmitter/receiver in a MIMO antenna system, an issue of reducing sizes of MIMO antennas and radio frequency (RF) chains and an issue of improving MIMO antenna-based beamforming technology may need to be solved.

To reduce the sizes of the RF chains, a MIMO antenna circuit may need to be provided in a restricted sized, and a performance of a signal processing algorithm may need to be maintained even when degrees of freedom (DoF) of a MIMO antenna decreases in response to an increase in influences of electromagnetic coupling and a spatial correlation between antennas due to the reduced sizes. Also, in an economical aspect, it is necessary to reduce costs for an individual RF chain installed for each antenna.

To solve the above issues, there has been provided a MIMO antenna system in a structure including a single active antenna and passive antennas or parasitic antennas surrounding the active antennas. In this structure, a mutual coupling effect may be realized by connecting an RF chain to only the active antenna and applying a current to the passive antennas. Typical MIMO antenna transmission methods may be directly implemented in the structure, and it is referred to as a beam-space MIMO antenna system.

A multiplexing method of a typical MIMO antenna system may be performed by mapping an individual signal to each antenna. In contrast, the beam-space MIMO antenna system may select a beam from preset beams and transmit a modulated signal in a direction of the selected beam.

In terms of improving the beamforming technology, a beamforming performance has increased according to an increase the number of antennas of the transmitter and receiver to achieve a high array gain, and research on technology for increasing a throughput through beamforming has also been actively conducted.

To apply the technology for increasing the throughput through the beamforming, a feedback on accurate channel information may need to be provided from a receiver to a transmitter. For this reason, the throughput may be restricted based on a channel state and an amount of radio resources assigned to the feedback. Communication technology using the beam-space MIMO antenna system may also be affected by the restricted throughput. Thus, there is a desire for technology of stably increasing a throughput even when a feedback on channel information is not provided in the beam-space MIMO antenna system. Also, when the number of antennas increases, the number of designable antennas may be equal to or less than the increased number of antennas. In this instance, a relatively small number of transmission streams may lead to a presence of reserve beam dimension. Thus, there is a desire for technology of increasing an availability of the reserve beam dimension to achieve a maximum gain of the increased number of antennas.

BRIEF SUMMARY

According to an aspect, there is provided a beam modulation method based on a beam-space multiple input multiple output (MIMO) antenna system, the beam modulation method including generating a preparatory beam list including a plurality of beams, generating a beam combination table of beam combinations of beams selected from the preparatory beam list, generating a beam modulation rule to map the beam combinations and bit data patterns, and determining a beam combination corresponding to input data from the beam combination table based on the beam modulation rule.

According to another aspect, there is also provided a beam demodulation method based on a MIMO antenna system, the beam demodulation method including receiving a symbol transmitted through a beam combination determined from a beam combination table of beam combinations, generating decoding metrics for determining the beam combination through which the symbol is transmitted based on the beam combination table, and decoding the symbol using a bit data pattern corresponding to the symbol based on a beam modulation rule to map the beam combinations and bit data patterns by determining the beam combination through which the symbol is transmitted based on the decoding metrics.

BRIEF DESCRIPTION OF THE DRAWINGS

These and/or other aspects, features, and advantages of the invention will become apparent and more readily appreciated from the following description of embodiments, taken in conjunction with the accompanying drawings of which.

DETAILED DESCRIPTION

Figure 1:
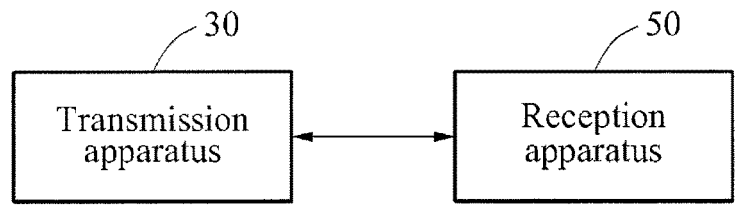
FIG. 1 is a block diagram illustrating a communication system according to an example embodiment.

Hereinafter, some example embodiments will be described in detail with reference to the accompanying drawings. Regarding the reference numerals assigned to the elements in the drawings, it should be noted that the same elements will be designated by the same reference numerals, wherever possible, even though they are shown in different drawings. The following specific structural or functional descriptions are exemplary to merely describe the examples, and the scope of the examples is not limited to the descriptions provided in the present specification.

Various example embodiments will now be described more fully with reference to the accompanying drawings in which some example embodiments are shown. It should be understood, however, that there is no intent to limit this disclosure to the particular example embodiments disclosed. On the contrary, example embodiments are to cover all modifications, equivalents, and alternatives falling within the scope of the example embodiments.

It will be understood that, although the terms first, second, etc., may be used herein to describe various elements, these elements should not be limited by these terms. These terms are only used to distinguish one element from another. For example, a first element could be termed a second element, and, similarly, a second element could be termed a first element without departing from the teachings of the disclosure.

It will be understood that when an element or layer is referred to as being "on," "attached to," or "connected to" another element or layer, it can be directly on or connected to the other element or layer or through intervening elements or layers, which may be present. In contrast, when an element is referred to as being "directly on," "directly attached to," or "directly connected to" another element or layer, there are no intervening elements or layers present. Other words used to describe the relationship between elements or layers should be interpreted in a like fashion (e.g., "between" versus "directly between," "adjacent" versus "directly adjacent," "on" versus "directly on").

The terminology used herein is for the purpose of describing particular examples only and is not to be limiting of the examples. As used herein, the singular forms "a," "an," and "the" are intended to include the plural forms as well, unless the context clearly indicates otherwise. It will be further understood that the terms "include/comprise" and/or "have" when used in this specification, specify the presence of stated features, integers, steps, operations, elements, components, and/or combinations thereof, but do not preclude the presence or addition of one or more other features, numbers, steps, operations, elements, components, and/or groups thereof.

Unless otherwise defined, all terms including technical and scientific terms used herein have the same meaning as commonly understood by one of ordinary skill in the art to which the examples belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In the present disclosure, a "transmitter" or a "transmission device" may include one of a terminal, a relay station, and a base station configured to transmit a downlink signal. Also, a receiver or a reception device may include one of a terminal, a relay station, a base station configured to receive a downlink signal from a transmitter.

The following descriptions are provided as an example based on a multiplexing method of beam-space multiple input multiple output (MIMO) communication technology, and the present disclosure is also extensively applicable to MIMO communication techniques such as a diversity method, for example.

Throughout the drawings, a MIMO transmitter and/or receiver may include any type of devices configured to transmit and receive a radio wave based on MIMO antennas, for example, electronically steerable parasitic array radiator (ESPAR) antennas, load modulated MIMO antennas, and hybrid MIMO antennas, and a general MIMO transmitter and receiver, for example, a full radio frequency (RF) chain.

Terms used in this disclosure are defined as follows:

A beam-space may be a space in which a beam is generated using a beam vector as a basis vector. In this example, the beam may be determined based on an antenna receiving a power input among transmission antennas. Thus, when $N_T$ transmission antennas are present, the beam-space may be an $N_T$-dimensional beam-space. In the following descriptions related to a beam-space multi-antenna system, $N_T$ denotes a number of transmission antennas and $N_R$ denotes a number of reception antennas.

A decoding metric may indicate an equation and/or a calculation result for decoding data based on a received symbol at a receiving end. As an example, in maximum likelihood estimation (MLE), the decoding metrics may be a probability that a current signal is to be received in each transmittable symbol.

A beam modulation scheme may indicate that information is expressed based on a beam combination.

Hereinafter, example embodiments of stably increasing a throughput in a beam-space MIMO antenna-based communication system will be described.

FIG. 1 is a block diagram illustrating a communication system according to an example embodiment.

Referring to FIG. 1, a communication system 10 may include communication apparatuses, for example, a transmission apparatus 30 and a reception apparatus 50.

The communication system 10 may perform communication in a wireless communication environment. The communication system 10 may perform the communication based on, for example, third generation partnership project (3GPP), long-term evolution (LTE), and world interoperability for microwave access (WiMAX).

The transmission apparatus 30 may be a beam-space MIMO antenna-based transmission apparatus. The reception apparatus 50 may be a beam-space MIMO antenna-based reception apparatus.

Each of the communication apparatuses may be at least one of a base station, a relay station, and a terminal. The terminal may be implemented as, for example, a portable electronic device. The portable electronic device may be implemented as, for example, a laptop computer, a mobile phone, a smartphone, a tablet PC, a mobile Internet device (MID), a personal digital assistant (PDA), an enterprise digital assistant (EDA), a digital still camera, a digital video camera, a portable multimedia player (PMP), a personal navigation device or portable navigation device (PND), a handheld console, an e-book, and a smart device. The smart device may be implemented to be, for example, a smart watch and a smart band.

Operations of each of the communication apparatuses will be described as an example with reference to FIGS. 2 through 14.

Figure 2:
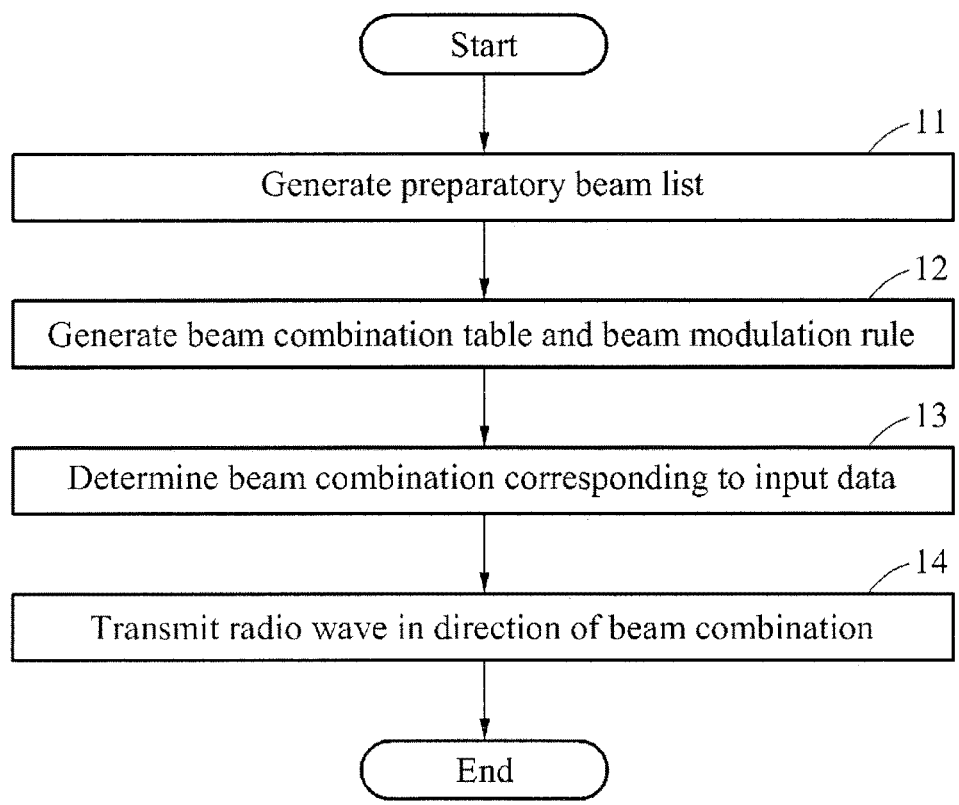
FIG. 2 is a flowchart illustrating an operation method of a transmission apparatus according to an example embodiment.

FIG. 2 is a flowchart illustrating an operation method of a transmission apparatus according to an example embodiment.

Referring to FIGS. 1 and 2, the transmission apparatus 30 may perform a beam modulation method based on a beam-space MIMO antenna.

The transmission apparatus 30 may be a beam-space MIMO antenna-based communication apparatus.

In operation 11, the transmission apparatus 30 may generate a preparatory beam list including $N_B$ beams, $N_B$ being greater than the number of transmission antennas.

In operation 12, the transmission apparatus 30 may generate a beam combination table of beam combinations of K beams selected from the preparatory beam list and generate a beam modulation rule to map the beam combinations and bit data patterns, each having a length of L bits.

In operation 13, the transmission apparatus 30 may determine a beam combination corresponding to input data from the beam combination table based on the beam modulation rule. For example, the transmission apparatus 30 may compare the input data to the bit data patterns based on the beam modulation rule and determine the beam combination corresponding to the input data from the beam combination table.

In operation 14, the transmission apparatus 30 may transmit a symbol corresponding to the input data in a direction of the determined beam combination.

Here, each of $N_B$, K, and L is a positive integer satisfying an equation, for example, $$2^L \le \binom{N_B}{K}.$$

In the equation, a left-hand side is a number of the bit data patterns, each having the length of L bits and a right-hand side is a number of elements included in the beam combination table. In this example, a number of patterns of the input data may need to be less than a number of the determined beam combination or output beam combination such that the transmission apparatus 30 expresses the input data using the determined beam combination and transmits the input data to the determined beam combination.

In operation 14, the transmission apparatus 30 may increase a throughput by transmitting a signal modulated based on a digital modulation scheme such as a quadrature amplitude modulation and a phase shift keying in lieu of transmitting the symbol corresponding to the input data in a direction of the determined beam combination. When the transmission apparatus 30 transmits the signal modulated based on the digital modulation scheme, the reception apparatus 50 may need to additionally perform a digital demodulating operation corresponding thereto.

In terms of increasing the throughput, $N_B$ may need to be greater than the number of transmission antennas. When $N_B$ is less than or equal to the number of transmission antennas, beams of the preparatory beam list may be independent of one another. When $N_B$ is greater than the number of transmission antennas, beams of the preparatory beam list may have a low correlation with one another.

In this example, the transmission apparatus 30 may generate the preparatory beam list using beams having a low correlation with one another and generated based on a method using at least one of a partial Gabor frame, a discrete Fourier transform (DFT), Kerdock codes, and Hadamard.

An operation of generating the preparatory beam list may be a design of beams. The design of beams may be an operation of setting an $N_T \times N_B$-dimensional matrix. As an example, the design of beams may be an operation of structuring $N_B N_T$-dimensional beams to provide, for example, $N_B$ beam vectors, each including $N_T$ elements. To optimize a performance of beam modulation, $N_B$ beams may be unit-norm, for example, power normalization vectors having a low cross-correlation with one another.

To this end, a scheme of constructing an $N_T \times N_B$-dimensional beam modulation matrix by selecting $N_B$ columns from an $N_T \times N_T$-dimensional unitary matrix may be used. For example, a Grassmannian frame and a Steiner frame may be applied to achieve a low correlation.

Golay complementary sequences and Frank Zadoff-Chu sequences may be applied to be a sequence perspective design. An application of sequences may allow an achievement of a low peak-to-average power ratio (PAPR), and thus a power amplifier efficiency of the transmission apparatus 30 may be maximized.

Concisely, the transmission apparatus 30 may increase a throughput by using a preparatory beam list including the number of beams greater than the number of transmission antennas.

Hereinafter, an example of the transmission apparatus 30 generating the preparatory beam list will be described in detail.

The transmission apparatus 30 may generate a preparatory beam list $B \in \mathbb{C} N_T \times N_B$ as shown in Equation 1.

$$B = SU \quad (1)$$

In Equation 1, $U \in \mathbb{C} N_B \times N_B$ may be a predetermined unitary matrix, and $S \in \mathbb{N} N_T \times N_B$ may be a matrix in which one each column and row includes one element corresponding to "1" and other elements correspond to "0." For example, a matrix S may be a selection matrix provided to select $N_T$ columns from all columns of a matrix U.

As an example, if $N_T=2$, and if $N_B=5$, in response to a determination of the matrices S and U, the preparatory beam list B may be constructed as shown in Equation 2.

$$S = \begin{bmatrix} 1 & 0 & 0 & 0 & 0 \\ 0 & 0 & 0 & 1 & 0 \end{bmatrix}, \quad (2)$$

$$U = \begin{bmatrix} u_{11} & u_{12} & u_{13} & u_{14} & u_{15} \\ u_{21} & u_{22} & u_{23} & u_{24} & u_{25} \\ u_{31} & u_{32} & u_{33} & u_{34} & u_{35} \\ u_{41} & u_{42} & u_{43} & u_{44} & u_{45} \\ u_{51} & u_{52} & u_{53} & u_{54} & u_{55} \end{bmatrix}$$

$$B = \begin{bmatrix} u_{11} & u_{12} & u_{13} & u_{14} & u_{15} \\ u_{41} & u_{42} & u_{43} & u_{44} & u_{45} \end{bmatrix}$$

In Equation 2, the preparatory beam list B may be a matrix including five preparatory beams identically to the number $N_B$. For example, the preparatory beam list B may be generated by selecting partial columns from the predetermined unitary matrix U.

The matrix U may be a unitary matrix having a property, for example, $U^H U = I$. As an example, the matrix U may be a matrix generated or configured based on a method using at least one of a discrete Gabor transform matrix, a DFT matrix, a discrete cosine transform matrix, a Haar wavelet transform matrix, the Kerdock codes, the Hadamard codes, a Grassmannian frame, and a Steiner Frame. As another example, the matrix U may be generated based on Pseudo-random sequences in communication. The Pseudo-random sequences may include, for example, Franky-Zadoff-Chu sequences, Golay complementary sequences. In this instance, a low peak-to-average-power ratio (PAPR) may be realized.

In an example, the matrix U may be configured based on the Hadamard codes, the discrete cosine transform matrix, the DFT matrix, and the Haar wavelet transform matrix as shown in Equation 3.

$$U_{Hadamard} = \begin{bmatrix} 0.5 & 0.5 & 0.5 & 0.5 \\ 0.5 & -0.5 & 0.5 & -0.5 \\ 0.5 & 0.5 & -0.5 & -0.5 \\ 0.5 & -0.5 & -0.5 & 0.5 \end{bmatrix} \quad (3)$$

$$U_{DCT} = \begin{bmatrix} 0.5 & 0.5 & 0.5 & 0.5 \\ 0.6533 & 0.2706 & -0.2706 & -0.6533 \\ 0.5 & -0.5 & -0.5 & 0.5 \\ 0.2706 & -0.653 & 0.6533 & -0.2706 \end{bmatrix}$$

$$U_{DFT} = \begin{bmatrix} 0.5 & 0.5 & 0.5 & 0.5 \\ 0.5 & -0.5i & -0.5 & 0.5i \\ 0.5 & -0.5 & 0.5 & -0.5 \\ 0.5 & 0.5i & -0.5 & -0.5i \end{bmatrix}$$

$$U_{Haar} = \begin{bmatrix} 0.5 & 0.5 & 0.5 & 0.5 \\ 0.5 & 0.5 & -0.5 & -0.5 \\ 0.7071 & -0.7071 & 0 & 0 \\ 0 & 0 & 0.7071 & -0.7071 \end{bmatrix}$$

Figure 3:
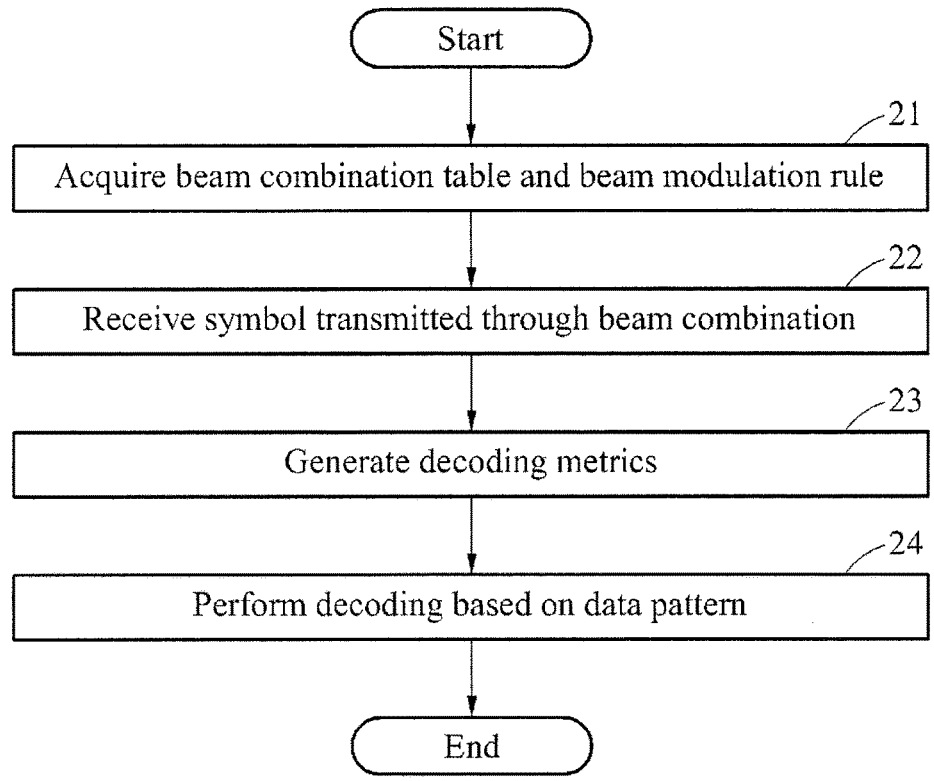
FIG. 3 is a flowchart illustrating an operation method of a reception apparatus according to an example embodiment.

FIG. 3 is a flowchart illustrating an operation method of a reception apparatus according to an example embodiment.

Referring to FIGS. 1 through 3, the reception apparatus 50 may perform a beam-space MIMO antenna-based beam demodulation method. A decoding process of the reception apparatus 50 may include, for example, a decoding process of a beam combination used in the transmission apparatus 30 and a decoding process of a symbol mapped to a beam to be transmitted.

In operation 21, the reception apparatus 50 may acquire a beam combination table and a beam modulation rule. For example, the transmission apparatus 30 and the reception apparatus 50 may mutually communicate through a control channel based on a beam combination table and a beam modulation rule prearranged therebetween.

In operation 22, the reception apparatus 50 may receive a symbol transmitted through a beam combination determined from the beam combination table. In this example, the symbol may be received through an identification based on the beam modulation rule.

In operation 23, the reception apparatus 50 may generate decoding metrics for determining the beam combination through which the symbol is transmitted based on the beam combination table.

Hereinafter, an operation of the reception apparatus 50 generating decoding metrics using models of a transmitted symbol and a received symbol in the communication system 10 will be described as an example with reference to FIG. 4.

Figure 4:
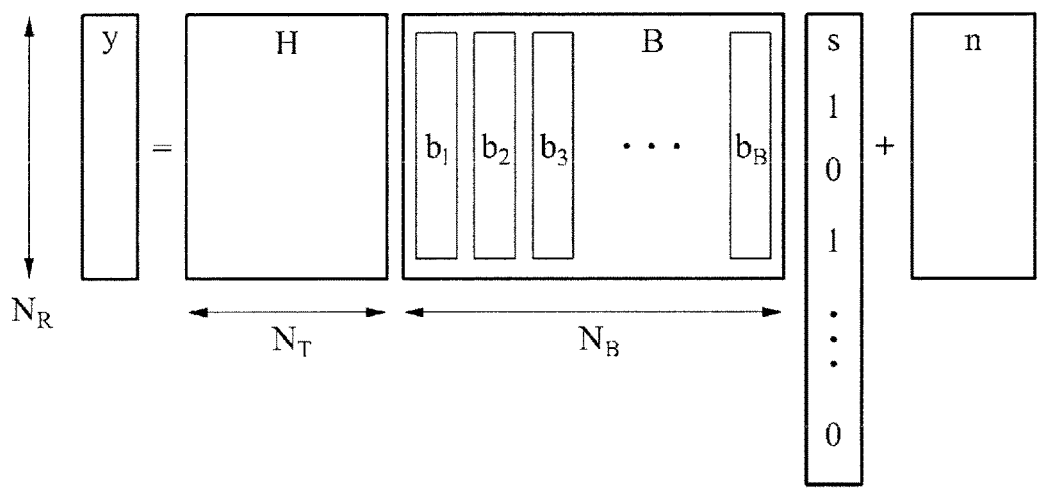
FIG. 4 is a diagram illustrating a transmitted symbol transmitted from a transmission apparatus and a received symbol received in a reception apparatus according to an example embodiment.

FIG. 4 is a diagram illustrating a transmitted symbol transmitted from a transmission apparatus and a received symbol received in a reception apparatus according to an example embodiment.

In FIG. 4, S denotes input data, B denotes a preparatory beam list, and X denotes a transmitted signal of a base band. Here, S may be an L-dimensional column vector, B may be an $N_T \times N_B$ matrix, and X may be an $N_T$-dimensional column vector.

Also, H denotes a matrix indicating a MIMO channel of the communication system 10, n denotes input noise of the reception apparatus 50, and y denotes a received signal. Here, H may be an $N_R \times N_T$ matrix, n may be an $N_R$-dimensional column vector, and y may be an $N_R$-dimensional column vector.

The transmitted symbol, for example, the transmitted signal of the base band and the received symbol, for example, the received signal may be defined as shown in Equation 4.

$$x = Bs$$

$$y = HBs + n \quad (K < N_B \leq N_T \leq N_B) \quad (4)$$

Based on Equation 4, a decoding method designated based on a maximum likelihood (ML) may be expressed as shown in Equation 5, and a decoding method designated based on a maximum a posteriori (MAP) may be expressed as shown in Equation 6.

$$\hat{x} = \underset{x \in A}{\operatorname{argmin}} \frac{1}{2} \| y - HBx \|_2^2 \text{ s.t. } \|x\|_0 = K \quad (5)$$

$$\hat{x} = \underset{x \in A}{\operatorname{argmin}} \frac{1}{2} \| y - HBx \|_2^2 + \lambda \|x\|_0 \quad (6)$$

In Equation 6, a probability of a beam activity in a modulation process may be applied using λ. In Equation 5, K denotes the beam activity and may indicate a number of beams activated at the same point in time.

In Equations 5 and 6, X denotes transmission data restored based on the received symbol, and A denotes a set including all transmittable symbols. Since results generated based on Equations 5 and 6 are substantially the same, at least one of Equations 5 and 6 may be selected and applied as a decoding method.

As an example, in terms of Equation 5, the decoding metrics may be expressed as shown in Equation 7.

$$\frac{1}{2}\|y - HBx\|_2^2 \text{ s.t. } \|x\|_0 = K \tag{7}$$

As shown above, it can be known that decoding metrics of Equation 7 is obtained from Equation 5 and a calculation of the decoding metrics needs to be performed on the set including all transmittable symbols. Thus, the decoding metrics may be calculated for each of the transmittable symbols based on Equation 7 and a transmitted symbol having a least value may be acquired from transmitted symbols, thereby restoring a bit data pattern corresponding to the acquired transmitted symbol. In an estimation of the transmitted symbol based on the received symbol, such a process may provide a result the same as that of a method of estimating the transmitted symbol by calculating a probability that an identical signal to a currently received y is to be received for each of transmitted symbol candidates and selecting a transmitted symbol corresponding to a greatest probability value from the transmitted symbol candidates when each of the transmitted symbol candidates is transmitted through a channel having noise. Thus, the same result may be obtained by applying the decoding metrics and calculating the probability.

Referring to FIGS. 1 through 4, in operation 24, the reception apparatus 50 may determine the beam combination through which the transmitted symbol using the decoding metrics and decode the transmitted symbol based on a bit data pattern corresponding to the transmitted symbol based on the beam modulation rule.

In operation 24, when the transmission apparatus 30 transmits a signal modulated based on a digital modulation method such as QAM and PSK in lieu of transmitting the transmitted symbol in the direction of the determined beam combination, the reception apparatus 50 may need to additionally perform a digital demodulating operation corresponding thereto.

Also, using the K beams selected to generate the beam combinations of the beam combination table, a decoding metric calculation may be performed on only transmitted symbol candidates satisfying a condition, thereby reducing an amount of operations. For example, the condition may be a beam combination including the K beams. A single beam combination including the K beams may be a constraint condition.

Figure 5:
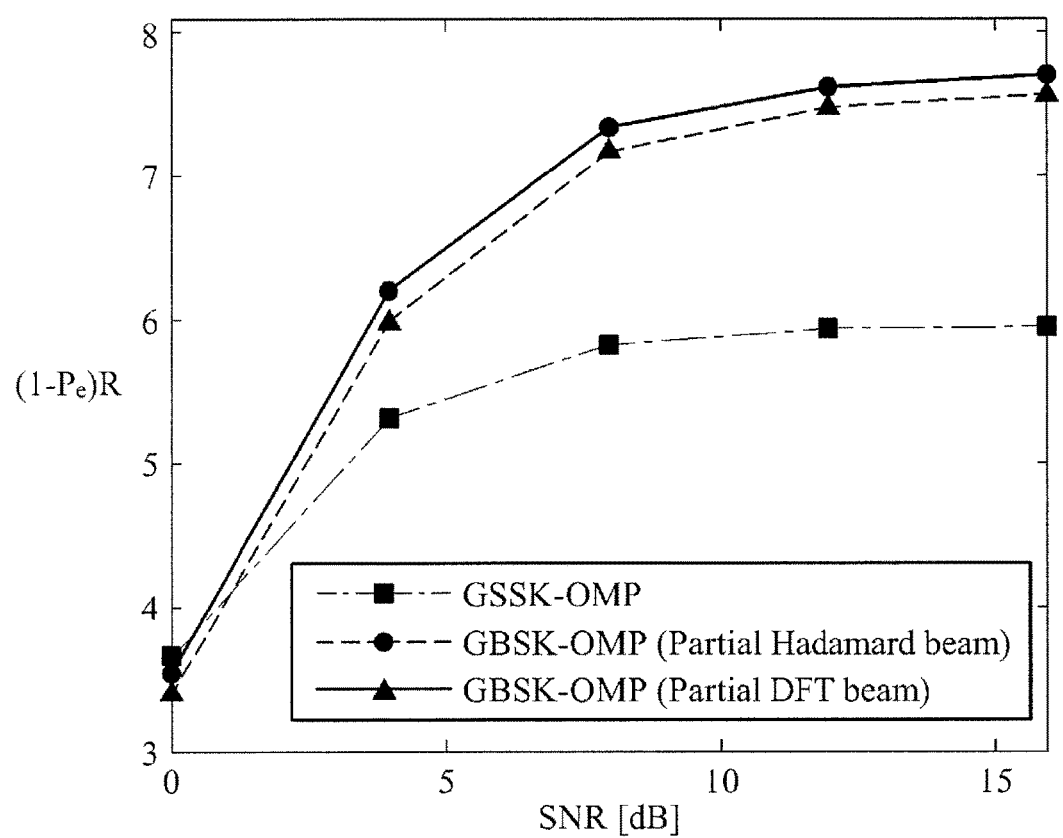
FIG. 5 is a graph illustrating a transmission rate in a beam modulation and demodulation method of a beam-space multiple input multiple output (MIMO) antenna-based communication system according to an example embodiment.

FIG. 5 is a graph illustrating a transmission rate in a beam modulation and demodulation method of a beam-space multiple input multiple output (MIMO) antenna-based communication system according to an example embodiment.

Referring to FIG. 5, in a simulation environment of FIG. 5, the communication system 10, for example, the transmission apparatus 30 may be set to have 16 transmission antennas, the reception apparatus 50 may be set to have 16 reception antennas, the number $N_B$ of beams in a preparatory beam list B may be set to 24, the number K of beams selected from the preparatory beam list B may be set to 2, and a channel may be assumed as a Rayleigh fading channel.

An index of performance evaluation may be a throughput calculated as shown in Equation 8.

$$\text{Throughput} = (1 - \text{FER}) \times R \tag{8}$$

In Equation 8, FER($P_e$) denotes a frame error rate. In the simulation environment, 100 symbols may be assumed as one frame. R denotes a spectral efficiency.

As illustrated in FIG. 5, the graph indicates an 8-bit throughput provided in example embodiments and indicates 6-bits throughput provided in a case in which the preparatory beam list is not applied. Thus, it can be known from the graph that a performance is increased by 25% in example embodiments when compared to the case in which the preparatory beam list is not applied.

Figure 6:
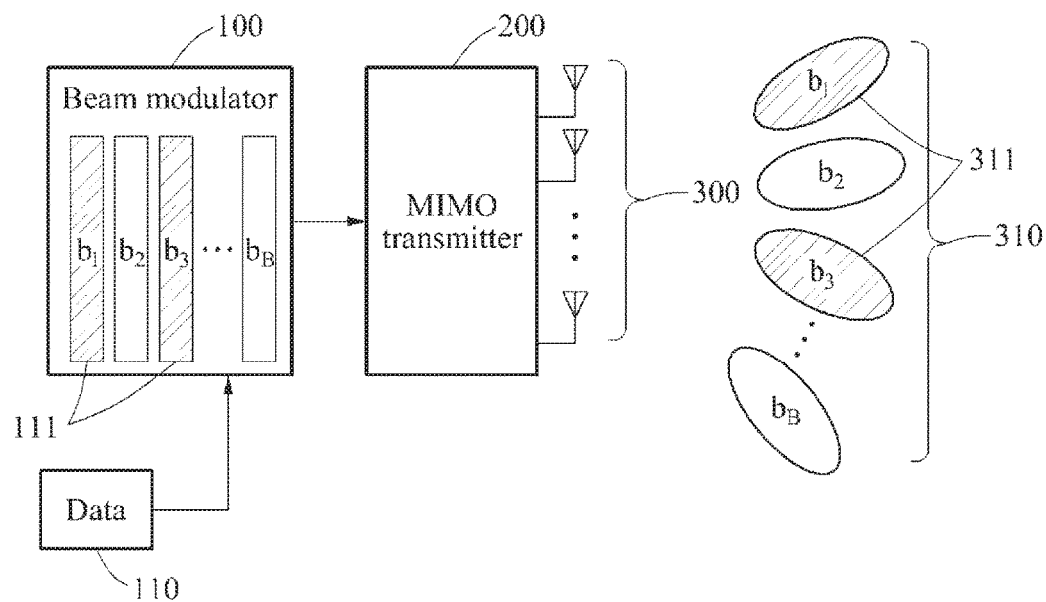
FIG. 6 is a diagram illustrating a beam modulation apparatus according to an example embodiment.

FIG. 6 is a diagram illustrating a beam modulation apparatus according to an example embodiment.

Referring to FIG. 6, the beam modulation apparatus may be a beam-space MIMO antenna-based modulation apparatus. The beam modulation apparatus may be included in the transmission apparatus 30 and/or the reception apparatus 50 of FIG. 1. Alternatively, the beam modulation apparatus may be the transmission apparatus 30 and/or the reception apparatus 50 of FIG. 1.

The beam modulation apparatus may include a beam modulator 100, a MIMO transmitter 200, and a transmission antenna unit 300.

The beam modulator 100 may generate a preparatory beam list including $N_B$ beams and select K beams from the preparatory beam list. Here, $N_B$ is greater than the number of transmission antennas included in the transmission antenna unit 300. The beam modulator 100 may generate a beam combination table including beam combinations of the K beams selected from the preparatory beam list. The beam modulator 100 may generate a beam modulation rule to map the beam combinations and bit data patterns, each having a length of L bits.

The beam modulator 100 may determine a beam combination 111 corresponding to input data 110 from the beam combination table. For example, the beam modulator 100 may compare the input data 110 to the bit data patterns based on the beam modulation rule to determine the beam combination 111 corresponding to the input data 110 from the beam combination table.

An operation in which the beam modulator 100 determines the beam combination 111 corresponding to the input data 110 may be repetitively performed until an input of the input data 110 is suspended. For example, the beam modulator 100 may determine the beam combination 111 corresponding to input data 110 for each item of the input data 110.

Here, each of $N_B$, K, and L is a positive integer satisfying an equation, for example, $$2^L \leq \binom{N_B}{K}.$$

The MIMO transmitter 200 may be connected to each of a plurality of antennas included in the transmission antenna unit 300, and may include RF paths to transmit a symbol corresponding to the input data 110 in a direction 311 of the beam combination 111 determined by the beam modulator 100.

The transmission antenna unit 300 may include the plurality of antennas and transmit the symbol a symbol corresponding to the input data 110 in a direction 311 of the beam combination 111 determined based on the input data 110 using the plurality of antennas. The symbol to be transmitted in the direction 311 of the beam combination 111 corresponding to the input data 110 may be included in a beam-space 310 formed with all preparatory beam lists.

Figure 7:
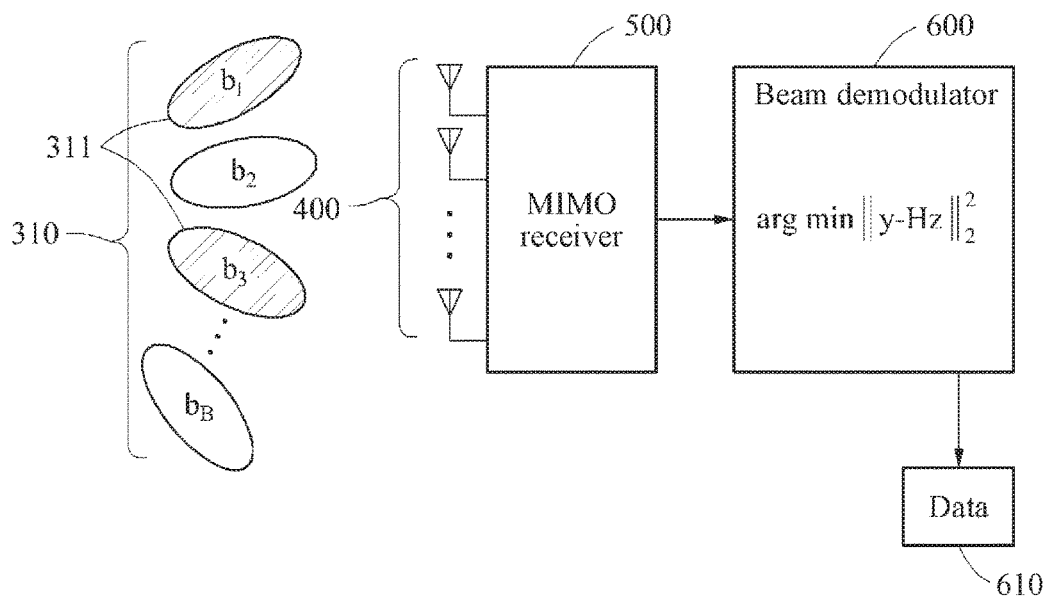
FIG. 7 is a diagram illustrating a beam demodulation apparatus according to an example embodiment.

FIG. 7 is a diagram illustrating a beam demodulation apparatus according to an example embodiment.

Referring to FIG. 7, the beam demodulation apparatus may be a beam-space MIMO antenna-based demodulation apparatus. As an example, the beam demodulation apparatus may be included in the transmission apparatus 30 and/or the reception apparatus 50 of FIG. 1. As another example, the beam modulation apparatus may be the transmission apparatus 30 and/or the reception apparatus 50 of FIG. 1.

The beam demodulation apparatus may include a reception antenna unit 400, a MIMO receiver 500, and a beam demodulator 600.

The reception antenna unit 400 may include a plurality of antennas and receive a radio wave transmitted through a beam combination using the plurality of antennas.

The MIMO receiver 500 may include RF paths connected to the plurality of antennas included in the reception antenna unit 400 to identify a symbol transmitted through a beam combination determined from a beam combination table based on a beam modulation rule and receive the identified symbol.

The beam demodulator 600 may acquire the beam combination table and the beam modulation rule, and generate decoding metrics for determining the beam combination through which the symbol is transmitted based on the beam combination table.

The beam demodulator 600 may determine the beam combination through which the symbol is transmitted based on the decoding metrics and decode the symbol using a bit data pattern corresponding to the symbol based on the beam modulation rule. By decoding the symbol, the beam demodulator 600 may generate data 610.

As described with reference to FIGS. 1 through 7, the example embodiments may add information expression corresponding to a beam combination configured with a plurality of beams in the beam-space MIMO antenna-based communication system, and apply the added information expression to a data modulation or a data demodulation, thereby stably increasing a throughput irrespective of whether a feedback on channel information is received.

Hereinafter, descriptions related to a method of modulating each beam included in a beam combination based on a corresponding modulation scheme and demodulating a result of the modulating will be also provided as another example with reference to FIGS. 8A through 14. For ease and conciseness of description, the descriptions are provided based on an example of a multiplexing method of beam-space MIMO antenna technologies. However, the present disclosure is also extensively applicable to any one of the beam-space MIMO antenna technologies such as a diversity method, for example.

Figure 8A:
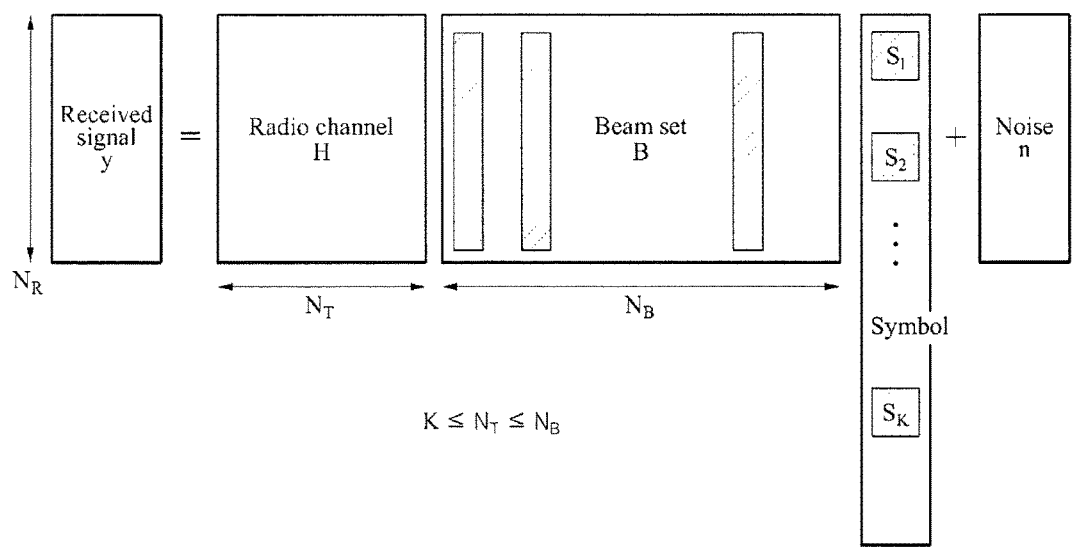
FIG. 8A is a diagram illustrating an example of a transmitted symbol and a received symbol of a beam modulation and demodulation method according to an example embodiment.
Figure 8B:
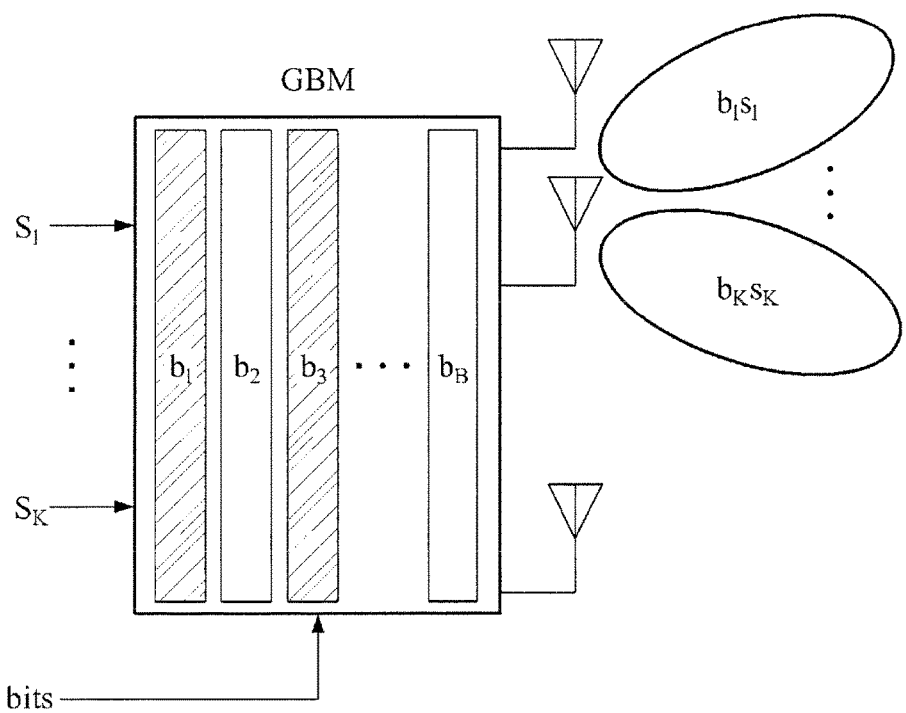
FIG. 8B is a diagram illustrating another example of a transmitted symbol and a received symbol of a beam modulation and demodulation method according to an example embodiment.

FIG. 8A is a diagram illustrating an example of a transmitted symbol and a received symbol of a beam modulation and demodulation method, and FIG. 8B is a diagram illustrating another example of the transmitted symbol and the received symbol of the beam modulation and demodulation method.

Referring to FIGS. 8A and 8B, the transmitted symbol may be transmitted by selecting a beam combination and modulating each beam included in the beam combination based on a corresponding modulation scheme.

A beam modulation scheme may include a scheme of transmitting K beams selected from $N_B$ beams through a power division during one symbol interval, and a scheme of transmitting K symbols to increase a throughput under a circumstance that channel information is absent in a transmitter. The symbol may include, for example, a binary phase shift keying (BPSK) symbol, and an M-ary quadrature amplitude modulation (M-QAM) symbol.

In a beam shift keying (BSK), information may be expressed using only a beam combination in order to be transmitted. For example, the BSK may be a scheme of selecting K beams from the $N_B$ beams and transmitting the K selected beams. In this example, an achievable throughput may be, for example, $\lfloor \log_2 N_B \rfloor$. In an example, if K=1, the scheme may be referred to as the BSK. In another example, if K>1, the scheme may be referred to as a generalized BSK (GBSK).

A beam modulation (BM) may be a scheme of selecting one beam, mapping the selected beam to one symbol, and transmitting a result of the mapping as illustrated in FIG. 8A.

A generalized BM (GBM) may be a scheme of expressing information based on a predetermined beam combination, mapping selected beams to symbols, and transmitting a result of the mapping as illustrated in FIG. 8B. The GBM may be, for example, a scheme of selecting K beams from $N_B$ beams, respectively mapping the K selected beams to symbols, and transmitting the K beams.

When a symbol is an M-ary modulated symbol, a throughput of $\log_2 M + \lfloor \log_2 N_B \rfloor$ may be achieved using the BM and a throughput of $$K\log_2 M + \left\lfloor \log_2 \binom{N_B}{K} \right\rfloor$$

may be achieved using the GBM. Here, M denotes a modulation order. Thus, the throughput may increase using the GBM. In the throughput achieved using the GBM, a first term may correspond to the M-ary modulated Symbol mapped to the K beams to be transmitted and a second term may correspond to information expressed in a process of selecting the K beams from the $N_B$ beams or a quantity of the information.

Figure 9:
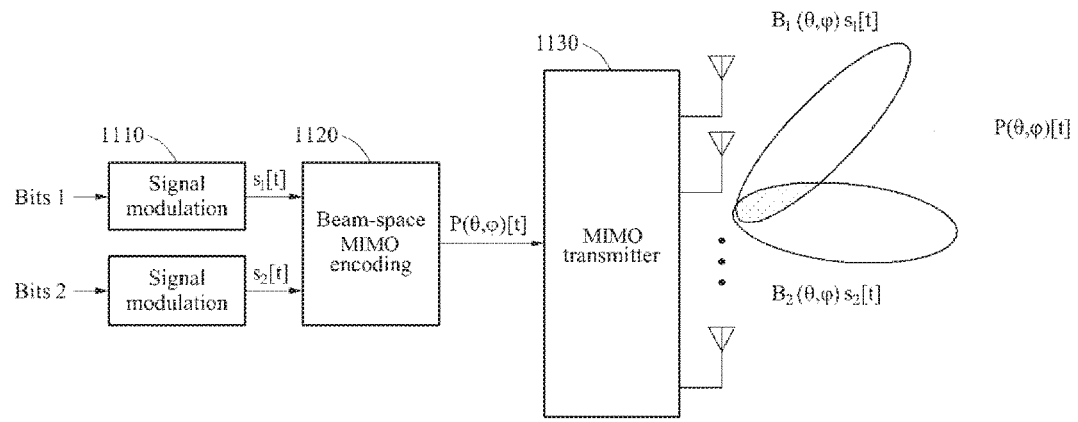
FIG. 9 is a diagram illustrating an example of a beam-space multiplexing-based transmission apparatus according to an example embodiment.

FIG. 9 is a diagram illustrating an example of a beam-space multiplexing-based transmission apparatus according to an example embodiment.

The data streams Bits 1 and Bits 2 may be independent of each other.

The transmission apparatus 30 (FIG. 1) may include a signal modulator 1110, a beam-space MIMO encoder 1120, and a MIMO transmitter 1130.

The signal modulator 1110 may modulate the data streams Bits 1 and Bits 2 to symbols $s_1[t]$ and $s_2[t]$ including size and phase information.

The beam-space MIMO encoder 1120 may encode the symbols $s_1[t]$ and $s_2[t]$, map encoded symbols to two fixed beams, integrate mapped symbols, and propagate a result of the integrating to a beam-space through the MIMO transmitter 1130. A final propagated beam pattern may be expressed as shown in Equation 9.

$$P(\theta,\phi)[t]=B_1(\theta,\phi)s_1[t]+B_2(\theta,\phi)s_2[t] \quad (9)$$

In general, the same number of independent or orthogonal beams as the number of antennas may be provided in the beam-space MIMO antenna system.

In example embodiments, the same number of beams as the number of streams may be selected from all beams to be used and thus, such degrees of freedom (DoF) may be expressed as additional information to be applied. Also, in example embodiments, each of the beams may be modulated based on a scheme of modulating a size, a phase, and the like of a signal.

Figure 10:
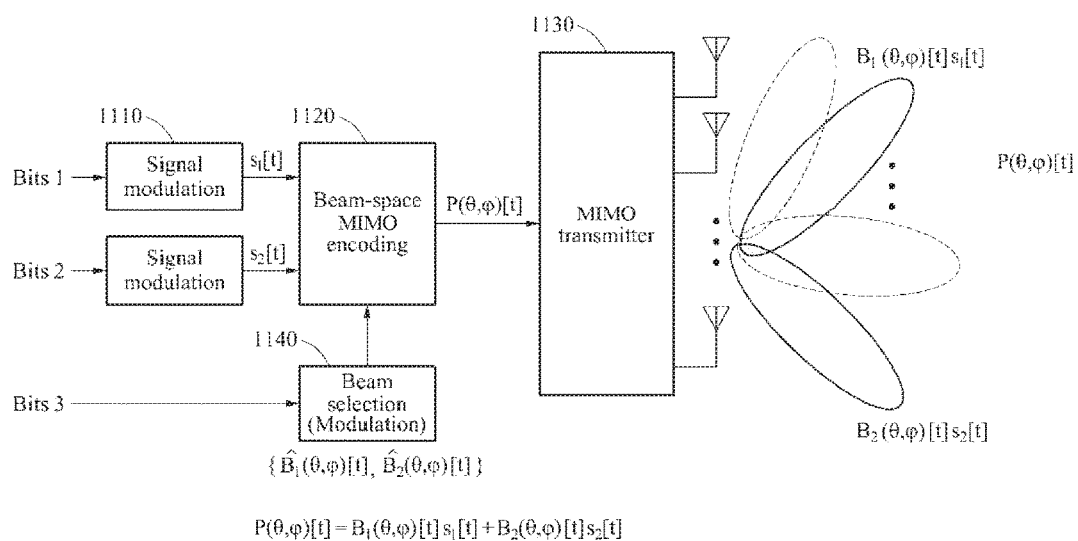
FIG. 10 is a diagram illustrating another example of a beam-space multiplexing-based transmission apparatus according to an example embodiment.

FIG. 10 is a diagram illustrating another example of a beam-space multiplexing-based transmission apparatus according to an example embodiment.

Referring to FIG. 10, the transmission apparatus 30 (FIG. 1) may modulate each beam included in a beam combination based on a corresponding modulation scheme.

The transmission apparatus 30 may include a signal modulator 1110, a beam-space MIMO encoder 1120, a MIMO transmitter 1130, and a beam selection modulator 1140.

The MIMO encoder 1120 and the beam selection modulator 1140 of FIG. 10 may be implemented as the beam modulator 100 of FIG. 6. Operations performed by the MIMO encoder 1120 and the beam selection modulator 1140 of FIG. 10 may be substantially the same as an operation performed in the beam modulator 100. Thus, a configuration including a combination of the MIMO encoder 1120 and the beam selection modulator 1140 may be substantially the same as the beam modulator 100 of FIG. 6.

The MIMO transmitter 1130 of FIG. 10 may be substantially the same as a configuration including a combination of the MIMO transmitter 200 and the transmission antenna unit 300 of FIG. 6. The MIMO transmitter 1130 of FIG. 10 may include a transmission antenna unit that is substantially the same as the transmission antenna unit 300 of FIG. 6.

Independent data streams Bits 1 and Bits 2 may be modulated to the symbols $s_1[t]$ and $s_2[t]$ including size and phase information through the signal modulator 1110.

An additional data stream Bits 3 may be modulated to a beam selection through the beam selection modulator 1140. For example, a beam or beams corresponding to the additional data stream Bits 3 may be selected from a beam combination table.

Through a beam-space encoding process in which the selected beams are mapped to the symbols $s_1[t]$ and $s_2[t]$, the additional data stream Bits 3 may be transmitted as shown in Equation 10. For example, symbols corresponding to the independent data streams Bits 1 and Bits 2 may be mapped to beams determined using the additional data stream Bits 3 to be transmitted.

Although the descriptions are provided based on two independent data streams as an example for increased ease and convenience, the number of data streams may be less than or equal to K that is the number of beams of a beam combination determined in practice.

$$P(\theta,\phi)[t]=B_1(\theta,\phi)[t]s_1[t]+B_2(\theta,\phi)[t]s_2[t] \quad (10)$$

In contrast to the transmission apparatus 30 of FIG. 9, the transmission apparatus 30 of FIG. 10 may differently perform the beam selection based on the additional data stream Bits 3. Thus, a used beam combination may vary based on a beam-space encoding time.

Schemes of beam selections or beam modulations and bits to be expressed in corresponding cases will be described as follows.

A size of beam set may be equal to or less than the number of antennas. When a channel feedback is provided, the size of beam set may be adjusted based on a channel state. Here, the number of transmission antennas may be $N_T$, the number of streams on which a signal modulation is to be performed may be $N_S$, and a signal modulation order may be M.

1) In a case in which the number of streams is fixed, information may be expressed based on the number of combinations selecting fixed $N_S$ streams from $N_T$ beams. In this example, the number of bits to be expressed may be, for example, $$N_S \log_2 M + \left\lfloor \log_2 \binom{N_T}{N_S} \right\rfloor$$

bits.

2) In a case in which the number of streams is variable, information may be expressed based on the number of combinations selecting variable $N_S$ streams from $N_T$ beams. In this example, the number of bits to be expressed may be, for example, $$N_S \log_2 M + \left\lfloor \log_2 \sum_{N_S=1}^{N_T} \binom{N_T}{N_S} \right\rfloor = N_S \log_2 M + N_T - 1$$

bits.

When compared to the transmission apparatus in an example of FIG. 9, additionally transmittable throughputs of the cases may be, for example, $$\left\lfloor \log_2 \binom{N_T}{N_S} \right\rfloor$$

bits and $N_T-1$ bits.

Various methods are applicable to be a mapping rule arranged between a beam selection combination and a bit stream, and the mapping rule may be arranged between a transmitter and a receiver in advance.

Figure 11:
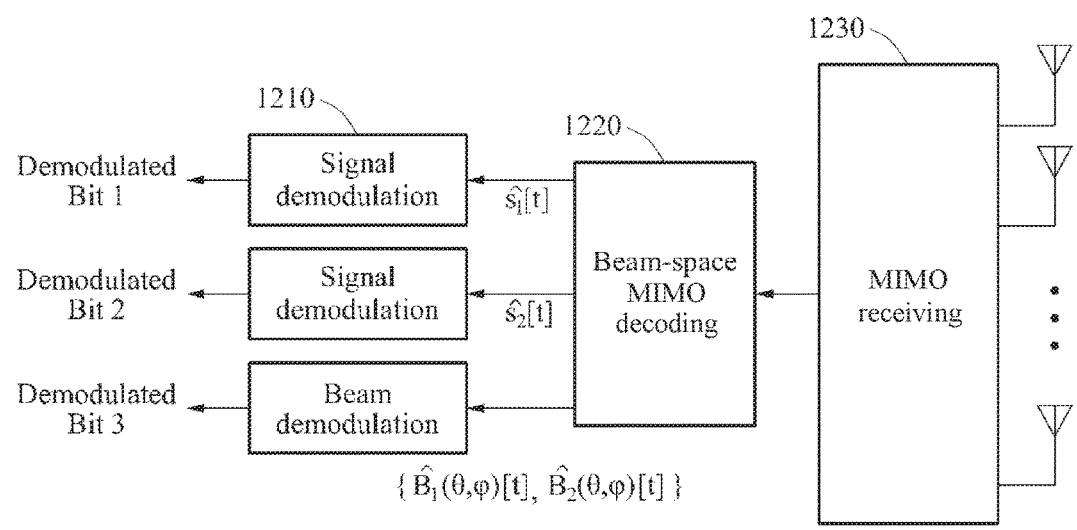
FIG. 11 is a diagram illustrating a beam-space multiplexing-based reception method according to an example embodiment.
Figure 12A:
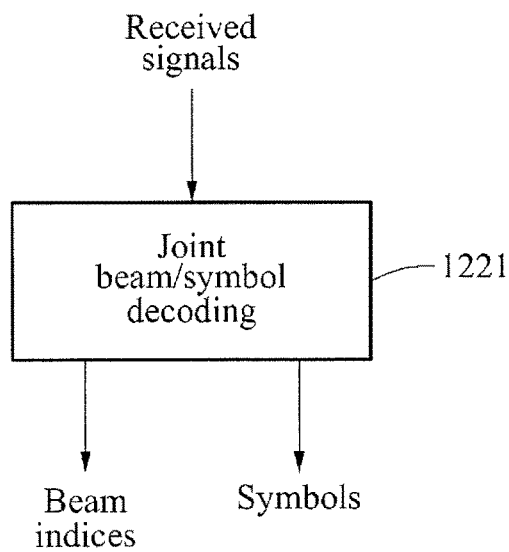
FIGS. 12A and 12B are diagrams illustrating an operation of a beam-space MIMO decoder of FIG. 11 according to an example embodiment.
Figure 12B:
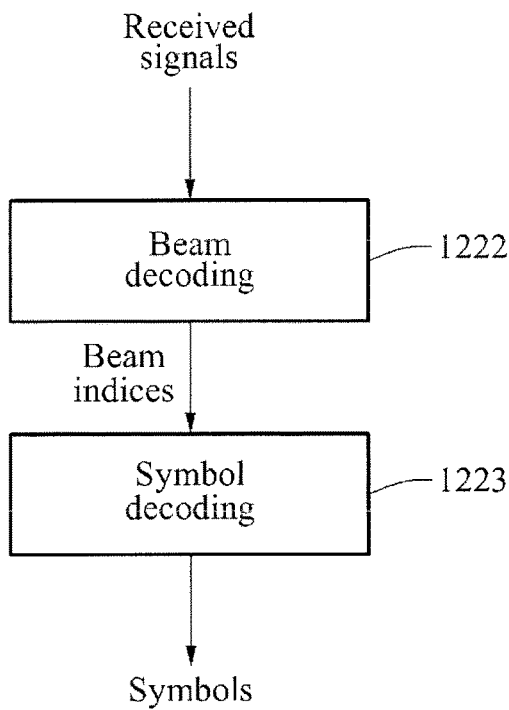

FIG. 11 is a diagram illustrating a beam-space multiplexing-based reception method according to an example embodiment. FIGS. 12A and 12B are diagrams illustrating an operation of a beam-space MIMO decoder of FIG. 11.

Referring to FIGS. 11 through 12B, the reception apparatus 50 (FIG. 1) may perform a symbol decoding and a beam decoding in contrast to a typical beam-space reception apparatus.

The reception apparatus 50 may include a signal demodulator 1210, a beam-space MIMO decoder 1220, and a MIMO receiver 1230.

The signal demodulator 1210 and the beam-space MIMO decoder 1220 of FIG. 11 may be implemented as the beam demodulator 600 of FIG. 7. Operations performed by the signal demodulator 1210 and the beam-space MIMO decoder 1220 of FIG. 11 may be substantially the same as an operation performed by the beam demodulator 600. Thus, a configuration including a combination of the signal demodulator 1210 and the beam-space MIMO decoder 1220 may be substantially the same as the beam demodulator 600 of FIG. 7.

The MIMO receiver 1230 of FIG. 11 may be substantially the same as a configuration including a combination of the MIMO receiver 500 and the reception antenna unit 400 of FIG. 7. The MIMO receiver 1230 of FIG. 11 may include a reception antenna unit substantially the same as the reception antenna unit 400 of FIG. 7.

Hereinafter, an operation of a reception apparatus, for example, the beam-space MIMO decoder 1220 will be described based on a maximum likelihood (ML).

A beam/symbol decoding may be performed by the beam-space MIMO decoder 1220 based on the following schemes. Here, a received signal may be y, a transmitted signal to generate P (θ, φ) may be x, and a radio channel between the transmission apparatus 30 and the reception apparatus 50 may be H.

1) Joint Beam-Space Decoding Scheme

A joint beam-space decoding scheme 1221 of the beam-space MIMO decoder 1220 may be performed as illustrated in FIG. 12A. For example, the beam-space MIMO decoder 1220 may perform joint decoding on symbols mapped to beam indices used in a transmission apparatus based on an ML rule as shown in Equation 11.

$$\{I_1, I_2, s_1, s_2\} = \arg\max P_y(y|x, H) = \arg\min \|y - Hx\|_2^2 \quad (11)$$

2) Sequential Beam-Space Decoding Scheme

A sequential beam-space decoding scheme of the beam-space MIMO decoder 1220 may be performed as illustrated in FIG. 12B. For example, the beam-space MIMO decoder 1220 may preferentially decode the beam '111 indices used in the transmission apparatus based on Equation 12. Subsequently, the beam-space MIMO decoder 1220 may sequentially decode symbols 1223 based on a decoding result as shown in Equation 13.

$$\{I_1, I_2\} = \arg\min \|y - Hx\|_2^2 \quad (12)$$

$$\{s_1, s_2\} = \arg\min \|y - Hx|\{I_1, I_2\}\|_2^2 \quad (13)$$

Hereinafter, a performance of the beam-space MIMO antenna-based communication system will be described as an example.

In the above simulation environment, the transmission apparatus 30 may be set to have 16 transmission antennas, the reception apparatus 50 may be set to have 8 reception antennas, and it is assumed that two transmitted streams are transmitted based on a 16-QAM modulation scheme. Also, a channel is assumed as a Rayleigh fading channel. An index of performance evaluation may be a throughput calculated as shown in Equation 14.

$$\text{Throughput} = (1 - \text{FER}) \times R \quad (14)$$

In Equation 14, FER is a frame error rate, and 100 symbols. In the simulation environment, 100 symbols are assumed as one frame. Also, R denotes a spectral efficiency.

Figure 13:
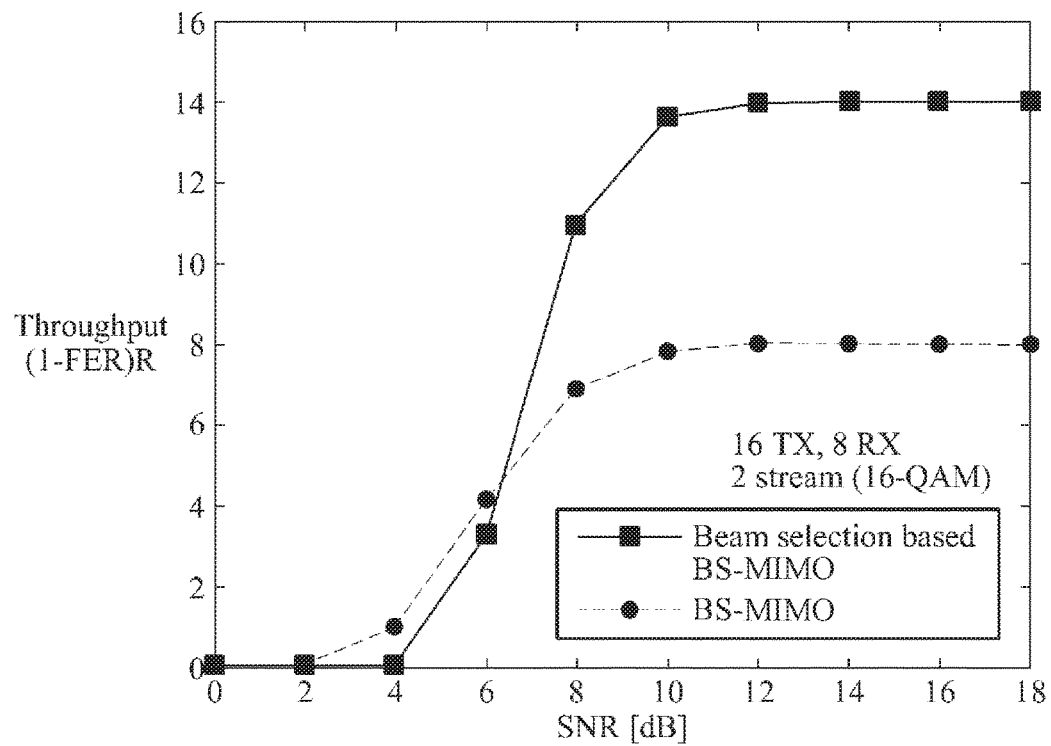
FIG. 13 is a graph illustrating a throughput performance in comparison to a throughput performance of a general beam-space MIMO antenna-based communication system according to an example embodiment.

FIG. 13 is a graph illustrating a throughput performance in comparison to a throughput performance of a general beam-space MIMO antenna-based communication system according to an example embodiment.

In a typical scheme, two 16-QAM, for example, 4-bit symbols may be transmitted and thus, 8-bit limit throughput performance may be provided. In example embodiments, another item of information may be expressed through a beam selection in addition to 8-bit information. Thus, a $$\left\lfloor \log_2\binom{16}{2} \right\rfloor = 6$$

bits gain may be achieved and 14-bit limit throughput performance may be provided.

In example embodiments, reserve beam resources may be used to express information in the beam-space MIMO antenna-based communication system and thus, an additional throughput may be achieved when compared to a typical scheme.

Figure 14:
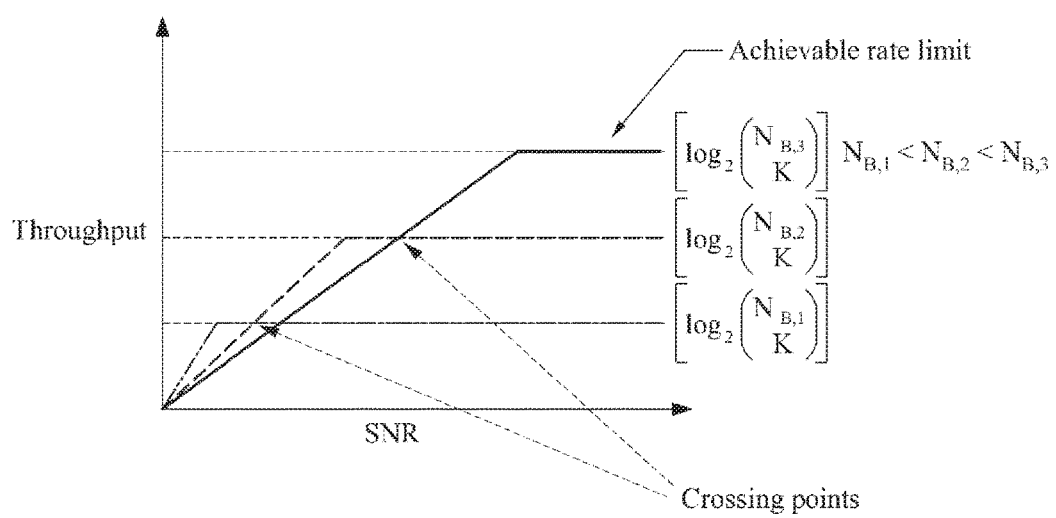
FIG. 14 is a graph illustrating a throughput crossing point based on a size of beam set in a beam-space MIMO antenna-based communication system according to an example embodiment.

FIG. 14 is a graph illustrating a throughput crossing point based on a size of beam set in a beam-space MIMO antenna-based communication system according to an example embodiment.

A size of beam set may be proportional to a frame error and an achievable throughput. Such a characteristic may allow throughput crossing points to be generated based on the size of beam set. SNR points corresponding to crossing points may be formed into a lookup table such that the size of beam set adaptively changes based on an SNR. As described with reference to FIGS. 1 and 8A through 14, a throughput of the beam-space MIMO antenna-based communication system may increase through an expression of additional information performed by using reserve beams in the beam-space MIMO antenna-based communication system.

The units and/or modules described herein may be implemented using hardware components and software components. For example, the hardware components may include microphones, amplifiers, band-pass filters, audio to digital convertors, and processing devices. A processing device may be implemented using one or more hardware devices configured to carry out and/or execute program code by performing arithmetical, logical, and input/output operations. The processing device(s) may include a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciate that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct and/or configure the processing device to operate as desired, thereby transforming the processing device into a special purpose processor. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blu-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the appended claims.

What is claimed is:

1. A beam modulation method based on a beam-space multiple input multiple output (MIMO) antenna system, the beam modulation method comprising:
   generating a preparatory beam list including a plurality of beams;
   generating a beam combination table of beam combinations of beams selected from the preparatory beam list;
   generating a beam modulation rule to map the beam combinations and bit data patterns; and
   determining a beam combination corresponding to input data from the beam combination table based on the beam modulation rule,
   wherein when the number of the plurality of beams is $N_B$, a number of the selected beams is K, and a length of each of the bit data patterns is L, each of $N_B$, K, and L is a positive integer satisfying the following equation:

$$2^L \leq \binom{N_B}{K}.$$

2. The beam modulation method of claim 1, wherein a number of the plurality of beams is greater than a number of transmission antennas of the beam-space MIMO antenna system.

3. The beam modulation method of claim 1, wherein the determining comprises comparing the input data to the bit data patterns based on the beam modulation rule and determining the beam combination corresponding to the input data from the beam combination table.

4. The beam modulation method of claim 1, wherein the preparatory beam list is a preparatory beam list including low correlation beams generated based on a method using at least one of a partial Gabor frame, a discrete Fourier transform (DFT), Kerdock codes, a Grassmannian frame, a Steiner frame, and Hadamard.

5. The beam modulation method of claim 1, wherein $N_B$ is adaptively determined such that a throughput is optimized based on a signal-to-noise rate (SNR) of a channel between a transmitter and a receiver.

6. The beam modulation method of claim 1, further comprising:
   modulating each beam included in the determined beam combination based on a data stream and a corresponding modulation scheme.

7. A beam modulation apparatus based on a beam-space multiple input multiple output (MIMO) antenna system, the beam modulation apparatus comprising:
   a beam modulator configured to generate a preparatory beam list including a plurality of beams, generate a beam combination table of beam combinations of beams selected from the preparatory beam list, generate a beam modulation rule to map the beam combinations and bit data patterns, and determine a beam combination corresponding to input data from the beam combination table based on the beam modulation rule;
   a transmission antenna unit comprising a plurality of transmission antennas; and
   a MIMO transmitter connected to each of the plurality of transmission antennas and comprising radio frequency (RF) paths to transmit a symbol corresponding to the input data,
   wherein when the number of the plurality of beams is $N_B$, a number of the selected beams is K, and a length of each of the bit data patterns is L, each of $N_B$, K, and L is a positive integer satisfying the following equation:

$$2^L \leq \binom{N_B}{K}.$$

8. The beam modulation apparatus of claim 7, wherein a number of the plurality of beams is greater than a number of transmission antennas of the beam-space MIMO antenna system.

9. The beam modulation apparatus of claim 7, wherein the preparatory beam list is a preparatory beam list including low correlation beams generated based on a method using at least one of a partial Gabor frame, a discrete Fourier transform (DFT), Kerdock codes, a Grassmannian frame, a Steiner frame, and Hadamard.

* * * * *